United States Patent
Danielson et al.

(10) Patent No.: US 12,254,904 B2
(45) Date of Patent: Mar. 18, 2025

(54) SYSTEM AND METHOD FOR PRODUCING A VIDEO STREAM

(71) Applicant: LIVEARENA TECHNOLOGIES AB, Stockholm (SE)

(72) Inventors: Magnus Danielson, Sollentuna (SE); Paul Van Den Haak, Bunnik (NL); Andreas Björkman, Täby (SE)

(73) Assignee: LiveArena Technologies AB, Stockholm (SE)

( * ) Notice: Subject to any disclaimer, the term of this patent is extended or adjusted under 35 U.S.C. 154(b) by 0 days.

(21) Appl. No.: 18/434,877

(22) Filed: Feb. 7, 2024

(65) Prior Publication Data

US 2024/0177483 A1    May 30, 2024

Related U.S. Application Data (63) Continuation of application No. PCT/SE2022/050933, filed on Oct. 14, 2022.

(30) Foreign Application Priority Data

Oct. 15, 2021   (SE) .................... 2151267-8

(51) Int. Cl.
  *G11B 27/10*   (2006.01)
  *G06V 10/82*   (2022.01)
  (Continued)

(52) U.S. Cl.
  CPC .............. *G11B 27/10* (2013.01); *G06V 10/82* (2022.01); *G06V 20/44* (2022.01); *G06V 20/46* (2022.01); *H04L 12/1813* (2013.01)

(58) Field of Classification Search
  CPC .................. G06V 20/44; G06V 20/46
  See application file for complete search history.

(56) References Cited

U.S. PATENT DOCUMENTS 9,445,051 B1    9/2016    Muthsandra Kantharaju et al.
11,184,560 B1   11/2021   Mese et al.
(Continued)

FOREIGN PATENT DOCUMENTS

KR    20200027638 A    3/2020
WO    2019191082 A2    10/2019

OTHER PUBLICATIONS

International search report issued by the Swedish Intellectual Property Office on Nov. 7, 2022.
(Continued)

*Primary Examiner* — Girumsew Wendmagegn
(74) *Attorney, Agent, or Firm* — Noréns Patentbyrå AB (57) ABSTRACT

Methods and systems, including computer software products, for providing a shared digital video stream. Primary digital video streams are collected from at least two digital video sources. The primary digital video streams are time-synchronised with respect to a common time reference. The time-synchronised streams are analysed to detect at least one pattern selected from a first set of patterns. The shared digital video stream is produced as an output digital video stream based on consecutively considered frames of the time-synchronised streams and the detected patterns. The output digital video stream is continuously provided. The synchronisation introduces latency, which gets included in the output digital video stream. The pattern detection includes considering information of the primary streams that is present in a later frame than a frame of a time-synchronised primary stream yet to be used in the production of the output stream.

19 Claims, 4 Drawing Sheets

(51) Int. Cl.
*G06V 20/40*   (2022.01)
*H04L 12/18*   (2006.01)

(56) References Cited

U.S. PATENT DOCUMENTS

| | | |
|---|---|---|
| 2004/0103150 A1 | 5/2004 | Ogdon et al. |
| 2011/0217021 A1 | 9/2011 | Dubin et al. |
| 2013/0216206 A1 | 8/2013 | Dubin et al. |
| 2015/0172202 A1 | 6/2015 | Zealey et al. |
| 2016/0073058 A1 | 3/2016 | Bader-Natal et al. |
| 2017/0111674 A1 | 4/2017 | Meredith et al. |
| 2017/0255826 A1 | 9/2017 | Chang et al. |
| 2018/0192000 A1 | 7/2018 | Mercredi et al. |
| 2018/0310033 A1 | 10/2018 | Johnson et al. |
| 2020/0267427 A1 | 8/2020 | Rogers et al. |
| 2021/0076001 A1 | 3/2021 | Periyannan et al. |
| 2021/0185276 A1 | 6/2021 | Peters et al. |
| 2021/0203519 A1 | 7/2021 | Sharma |
| 2021/0219012 A1 | 7/2021 | Maurice |
| 2022/0284929 A1* | 9/2022 | Zaklad .................. G11B 27/34 |
| 2022/0321933 A1* | 10/2022 | Gramo .................... A63F 13/86 |
| 2023/0066504 A1 | 3/2023 | Daha et al. |

OTHER PUBLICATIONS

Extended European search report issued on Dec. 2, 2024 by the European Patent Office.
Scott Firestone et al.: Lip Synchronization in Video Conferencing; Chapter 7.
Pablo Sendin-Rana et al.: Emulating Access Grid features at Web endpoints: a developer's view; Published Feb. 11, 2008.

\* cited by examiner

SYSTEM AND METHOD FOR PRODUCING A VIDEO STREAM

FIELD OF THE INVENTION

The various embodiments of the present invention relate to digital video and in particular to producing a digital video stream based on two or more different digital input video streams.

BACKGROUND

There are many known digital video conference systems, such as Microsoft® Teams®, Zoom® and Google® Meet®, offering two or more participants to meet virtually using digital video and audio recorded locally and broadcast to all participants to emulate a physical meeting.

There is a general need to improve such digital video conference solutions, in particular with respect to the production of viewed content, such as what is shown to whom at what time, and via what distribution channels.

For instance, some systems automatically detect a currently talking participant, and show the corresponding video feed of the talking participant to the other participants. In many systems it is possible to share graphics, such as the currently displayed screen, a viewing window, or a digital presentation. As virtual meetings become more complex, however, it quickly becomes more difficult for the service to know what of all currently available information to show to each participant at each point in time.

In other examples a presenting participant moves around on a stage while talking about slides in a digital presentation. The system then needs to decide whether to show the presentation, the presenter or both, or to switch between the two.

It may be desirable to produce one or several output digital video streams based on a number of input digital video streams by an automatic production process, and to provide such produced digital video stream or streams to one or several consumers.

However, in many cases it is difficult for a dynamic conference screen layout manager or other automated production function to select what information to show, due to a number of technical difficulties facing such digital video conference systems.

Firstly, since a digital video meeting has a real-time aspect, it is important that latency is low. This poses problems when different incoming digital video streams, such as from different participants joining using different hardware, are associated with different latencies, frame rates, aspect ratios or resolutions. Many times, such incoming digital video streams need processing for a well-formed user experience.

Secondly, there is a problem with time synchronisation. Since the various input digital video streams, such as external digital video streams or digital video streams provided by participants, are typically fed to a central server or similar, there is no absolute time to synchronise each such digital video feed to. Like too high latency, unsynchronised digital video feeds will lead to poor user experiences.

Thirdly, multi-party digital video meetings can involve different digital video streams having different encodings or formats, that require decoding and re-encoding in turn producing problems in terms of latency and synchronisation. Such encoding is also computationally burdensome and therefore costly in terms of hardware requirements.

Fourthly, the fact that different digital video sources may be associated with different frame rates, aspect ratios and resolutions may also result in that memory allocation needs may vary unpredictably requiring continuous balancing. This potentially results in additional latency and synchronisation problems. The result is large buffer requirements.

Fifthly, participants may experience various challenges in terms of variable connectivity, leaving/reconnecting etc., posing further challenges in automatically producing a well-formed user experience.

These problems are amplified in more complex meeting situations, for instance involving many participants; participants using different hardware and/or software to connect; externally provided digital video streams; screen-sharing; or multiple hosts.

The corresponding problems arise in the other contexts where an output digital video stream is to be produced based on several input digital video streams, such as in digital video production systems for education and instruction.

Various embodiments of the present invention solve one or several of the above-described problems.

SUMMARY

The various embodiments of the present invention relate to a system, computer software product and method for producing a digital video stream, and in particular for producing a digital video stream based on two or more different digital input video streams. In preferred embodiments, the digital video stream is produced in the context of a digital video conference or a digital video conference or meeting system, particularly involving a plurality of different concurrent users. The produced digital video stream may be published externally or within a digital video conference or digital video conference system.

Other embodiments are applied in contexts that are not digital video conferences, but where several digital video input streams are handled concurrently and combined into a produced digital video stream. For instance, such contexts may be educational or instructional.

Hence, the invention relates to a method for providing a shared digital video stream, the method includes the steps in a collecting step, collecting from at least two digital video sources respective primary digital video streams; in a synchronising step, time-synchronising the primary digital video streams with respect to a common time reference; in a pattern detection step, analysing the time-synchronised primary digital video streams to detect at least one pattern selected from a first set of patterns; in a production step, producing the shared digital video stream as an output digital video stream based on consecutively considered frames of the time-synchronised primary digital video streams and the detected patterns; and in a publishing step, continuously providing the output digital video stream to a consumer of the shared digital video stream, wherein the synchronisation step includes deliberately introducing a latency so that the output digital video stream is provided at least with the latency, and wherein the pattern detection step includes taking into consideration information of the primary digital video streams, the information being present in a later frame than a frame of a time-synchronised primary digital video stream yet to be used in the production of the output digital video stream.

The invention also relates to a computer software product for providing a shared digital video stream, the computer software function being arranged to, when executing, perform a collecting step, wherein respective primary digital video streams are collected from at least two digital video sources; a synchronising step, wherein the primary digital video streams are time-synchronised with respect to a common time reference; a pattern detection step, wherein the time-synchronised primary digital video streams are analysed to detect at least one pattern selected from a first set of patterns; a production step, wherein the shared digital video stream is produced as an output digital video stream based on consecutively considered frames of the time-synchronised primary digital video streams and the detected patterns; and a publishing step, wherein the output digital video stream is continuously provided to a consumer of the shared digital video stream, wherein the synchronisation step includes deliberately introducing a latency so that the output digital video stream is provided at least with the latency, and wherein the pattern detection step includes taking into consideration information of the primary digital video streams, the information being present in a later frame than a frame of a time-synchronised primary digital video stream yet to be used in the production of the output digital video stream.

Moreover, the invention relates to a system for providing a shared digital video stream, the system including a central server in turn including a collecting function, arranged to collect from at least two digital video sources respective primary digital video streams; a synchronising function, arranged to time-synchronise the primary digital video streams with respect to a common time reference; a pattern detection function, arranged to analyse the time-synchronised primary digital video streams to detect at least one pattern selected from a first set of patterns; a production function, arranged to produce the shared digital video stream as an output digital video stream based on consecutively considered frames of the time-synchronised primary digital video streams and the detected patterns; and a publishing function, arranged to continuously provide the output digital video stream to a consumer of the shared digital video stream, wherein the synchronisation function is arranged to deliberately introduce a latency so that the output digital video stream is provided at least with the latency, and wherein the pattern detection function is arranged to take into consideration information of the primary digital video streams, the information being present in a later frame than a frame of a time-synchronised primary digital video stream yet to be used in the production of the output digital video stream.

BRIEF DESCRIPTION OF THE DRAWINGS

In the following, the invention will be described in detail, with reference to exemplifying embodiments of the invention and to the enclosed drawings, wherein.

All Figures share reference numerals for the same or corresponding parts.

DETAILED DESCRIPTION

Figure 1:
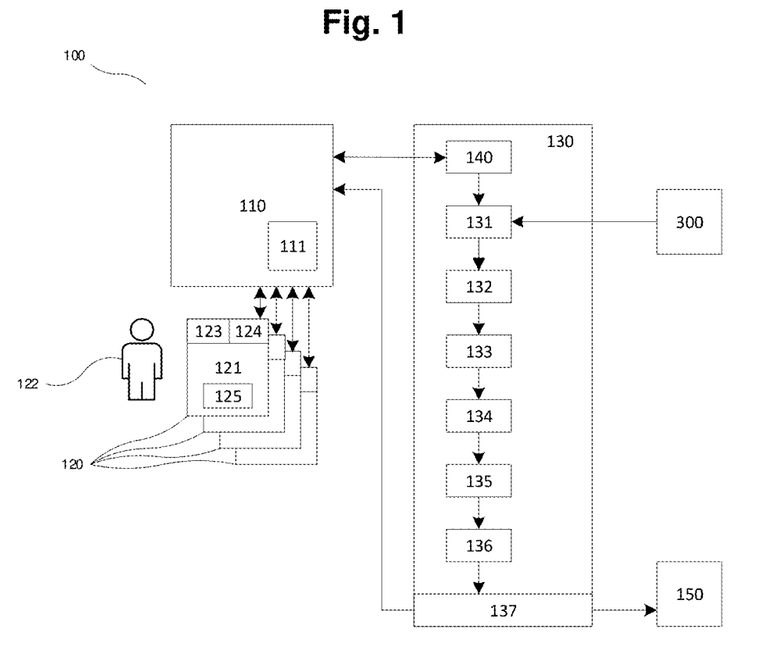
FIG. 1 illustrates a first system according to some embodiments.

FIG. 1 illustrates a system 100 according to one embodiment of the present invention, arranged to perform a method according to the invention for providing a shared digital video stream.

The system 100 may include a video communication service 110, but the video communication service 110 may also be external to the system 100 in some embodiments.

The system 100 may include one or several participant clients 121, but one, some or all participant clients 121 may also be external to the system 100 in some embodiments.

The system 100 includes a central server 130.

As used herein, the term "central server" is a computer-implemented functionality that is arranged to be accessed in a logically centralised manner, such as via well-defined API (Application Programming Interface). The functionality of such a central server may be implemented purely in computer software, or in a combination of software with virtual and/or physical hardware. It may be implemented on a standalone physical or virtual server computer or be distributed across several interconnected physical and/or virtual server computers.

The physical or virtual hardware that the central server 130 runs on, in other words that computer software defining the functionality of the central server 130 may include a per se conventional CPU, a per se conventional GPU, a per se conventional RAM/ROM memory, a per se conventional computer bus, and a per se conventional external communication functionality such as an internet connection.

The video communication service 110, to the extent it is used, is also a central server in the sense, that may be a different central server than the central server 130 or a part of the central server 130.

Correspondingly, each of the participant clients 121 may be a central server in the sense, with the corresponding interpretation, and physical or virtual hardware that each participant client 121 runs on, in other words that computer software defining the functionality of the participant client 121, may also include a per se conventional CPU/GPU, a per se conventional RAM/ROM memory, a per se conventional computer bus, and a per se conventional external communication functionality such as an internet connection.

Each participant client 121 also typically includes or is in communication with a computer screen, arranged to display video content provided to the participant client 121 as a part of an ongoing video communication; a loudspeaker, arranged to emit sound content provided to the participant client 121 as a part of the video communication; a video camera; and a microphone, arranged to record sound locally to a human participant 122 to the video communication, the participant 122 using the participant client 121 in question to participate in the video communication.

In other words, a respective human-machine interface of each participating client 121 allows a respective participant 122 to interact with the client 121 in question, in a video communication, with other participants and/or audio/video streams provided by various sources.

In general, each of the participating clients 121 includes a respective input means 123, that may include the video camera; the microphone; a keyboard; a computer mouse or trackpad; and/or an API to receive a digital video stream, a digital audio stream and/or other digital data. The input means 123 is specifically arranged to receive a video stream and/or an audio stream from a central server, such as the video communication service 110 and/or the central server 130, such a video stream and/or audio stream being provided as a part of a video communication and preferably being produced based on corresponding digital data input streams provided to the central server from at least two sources of such digital data input streams, for instance participant clients 121 and/or external sources (see below).

Further generally, each of the participating clients 121 includes a respective output means 124, that may include the computer screen; the loudspeaker; and an API to emit a digital video and/or audio stream, such stream being representative of a captured video and/or audio locally to the participant 122 using the participant client 121 in question.

In practice, each participant client 121 may be a mobile device, such as a mobile phone, arranged with a screen, a loudspeaker, a microphone and an internet connection, the mobile device executing computer software locally or accessing remotely executed computer software to perform the functionality of the participant client 121 in question. Correspondingly, the participant client 121 may also be a thick or thin laptop or stationary computer, executing a locally installed application, using a remotely accessed functionality via a web browser, and so forth, as the case may be.

There may be more than one, such as at least three, participant clients 121 used in one and the same video communication of the present type.

The video communication may be provided at least partly by the video communication service 110 and at least partly by the central server 130, as will be described and exemplified herein.

As the term is used herein, a "video communication" is an interactive, digital communication session involving at least two, preferably at least three, video streams, and preferably also matching audio streams that are used to produce one or several mixed or joint digital video/audio streams that in turn is consumed by one or several consumers, that may or may not also be contributing to the video communication via video and/or audio. Such a video communication is real-time, with or without a certain latency or delay. At least one, preferably at least two, participants 122 to such a video communication is involved in the video communication in an interactive manner, both providing and consuming video/audio information.

At least one of the participant clients 121, or all of the participant clients 121, include a local synchronisation software function 125, that will be described in closer detail below.

The video communication service 110 may include or have access to a common time reference, as will also be described in closer detail below.

The central server 130 may include an API 137, for digitally communicating with entities external to the central server 130. Such communication may involve both input and output.

The system 100, such as the central server 130, may be arranged to digitally communicate with, and in particular to receive digital information, such as audio and/or video stream data, from, an external information source 300, such as an externally provided video stream. That the information source 300 is "external" means that it is not provided from or as a part of the central server 130. Preferably, the digital data provided by the external information source 300 is independent of the central server 130, and the central server 130 cannot affect the information contents thereof. For instance, the external information source 130 may be live captured video and/or audio, such as of a public sporting event or an ongoing news event or reporting. The external information source 130 may also be captured by a web camera or similar, but not by any one of the participating clients 121. Such captured video may hence depict the same locality as any one of the participant clients 121, but not be captured as a part of the activity of the participant client 121 per se. One possible difference between an externally provided information source 300 and an internally provided information source 120 is that internally provided information sources may be provided as, and in their capacity as, participants to a video communication of the above-defined type, whereas an externally provided information source 300 is not, but is instead provided as a part of a context that is external to the video conference.

There may also be several external information sources 300, that provide digital information of the type, such as audio and/or video streams, to the central server 130 in parallel.

As shown in FIG. 1, each of the participating clients 121 constitutes the source of an information (video and/or audio) stream 120, provided to the video communication service 110 by the participating client 121 in question as described.

The system 100, such as the central server 130, may be further arranged to digitally communicate with, and in particular to emit digital information to, an external consumer 150. For instance, a digital video and/or audio stream produced by the central server 130 may be provided continuously, in real-time or near real-time, to one or several external consumers 150 via the API 137. Again, that the consumer 150 is "external" means that the consumer 150 is not provided as a part of the central server 130, and/or that it is not a party to the video communication.

Unless not stated otherwise, all functionality and communication herein is provided digitally and electronically, effected by computer software executing on suitable computer hardware and communicated over a digital communication network or channel such as the internet.

Hence, in the system 100 configuration illustrated in FIG. 1, a number of participant clients 121 take part in a digital video communication provided by the video communication service 110. Each participant client 121 may hence have an ongoing login, session or similar to the video communication service 110, and may take part in one and the same ongoing video communication provided by the video communication service 110. In other words, the video communication is "shared" among the participant clients 121 and therefore also by corresponding human participants 122.

In FIG. 1, the central server 130 includes an automatic participant client 140, being an automated client corresponding to participant clients 121 but not associated with a human participant 122. Instead, the automatic participant client 140 is added as a participant client to the video communication service 110 to take part in the same shared video communication as participant clients 121. As such a participant client, the automatic participant client 140 is granted access to continuously produced digital video and/or audio stream(s) provided as a part of the ongoing video communication by the video communication service 110 and can be consumed by the central server 130 via the automatic participant client 140. Preferably, the automatic participant client 140 receives, from the video communication service 110, a common video and/or audio stream that is or may be distributed to each participant client 121; a respective video and/or audio stream provided to the video communication service 110 from each of one or several of the participant clients 121 and relayed, in raw or modified form, by the video communication service 110 to all or requesting participant clients 121; and/or a common time reference.

The central server 130 includes a collecting function 131 arranged to receive video and/or audio streams of the type from the automatic participant client 140, and possibly also from the external information source(s) 300, for processing as described below, and then to provide a shared video stream via the API 137. For instance, this shared video stream may be consumed by the external consumer 150 and/or by the video communication service 110 to in turn be distributed by the video communication service 110 to all or any requesting one of the participant clients 121.

Figure 2:
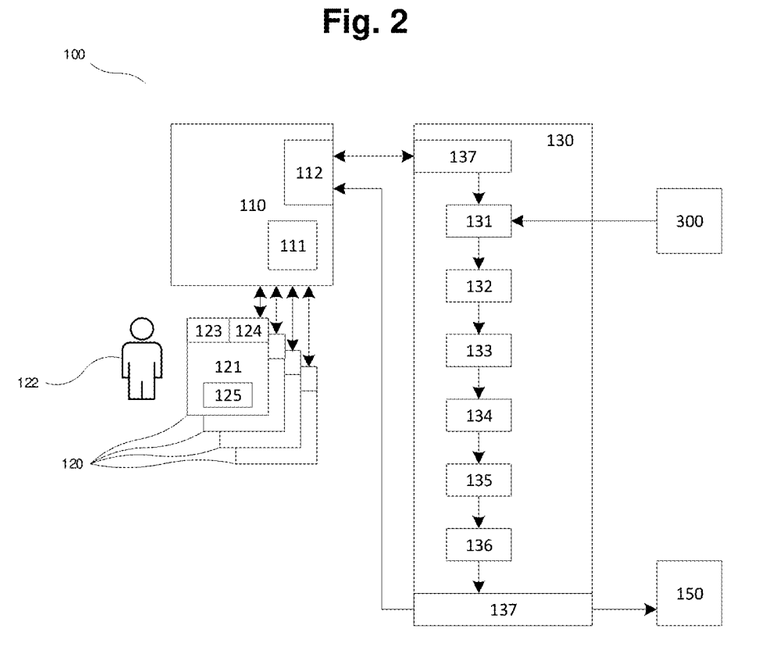
FIG. 2 illustrates a second system according to some embodiments.

FIG. 2 is similar to FIG. 1, but instead of using the automatic client participant 140 the central server 130 receives video and/or audio stream data from the ongoing video communication via an API 112 of the video communication service 110.

Figure 3:
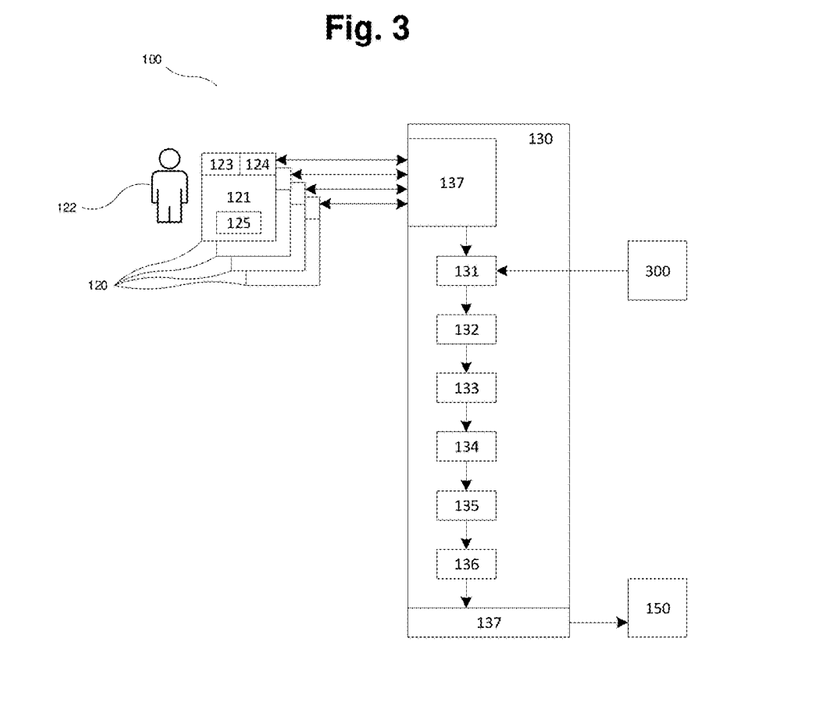
FIG. 3 illustrates a third system according to some embodiments.

FIG. 3 is also similar to FIG. 1 but shows no video communication service 110. In this case, the participant clients 121 communicate directly with the API 137 of the central server 130, for instance providing video and/or audio stream data to the central server 130 and/or receiving video and/or audio stream data from the central server 130. Then, the produced shared stream may be provided to the external consumer 150 and/or to one or several of the client participants 121.

Figure 4:
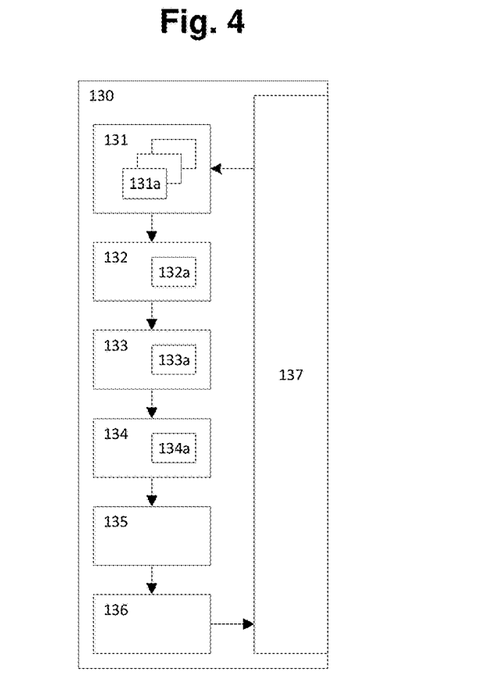
FIG. 4 illustrates a central server according to some embodiments.

FIG. 4 illustrates the central server 130 in closer detail. As illustrated, the collecting function 131 may include one or, preferably, several, format-specific collecting functions 131*a*. Each one of the format-specific collecting functions 131*a* is arranged to receive a video and/or audio stream having a predetermined format, such as a predetermined binary encoding format and/or a predetermined stream data container and is specifically arranged to parse binary video and/or audio data of the format into individual video frames, sequences of video frames and/or time slots.

The central server 130 further includes an event detection function 132, arranged to receive video and/or audio stream data, such as binary stream data, from the collecting function 131 and to perform a respective event detection on each individual one of the received data streams. The event detection function 132 may include an AI (Artificial Intelligence) component 132*a* for performing the event detection. The event detection may take place without first time-synchronising the individual collected streams.

The central server 130 further includes a synchronising function 133, arranged to time-synchronise the data streams provided by the collecting function 131 and processed by the event detection function 132. The synchronising function 133 may include an AI component 133*a* for performing the time-synchronisation.

The central server 130 further includes a pattern detection function 134, arranged to perform a pattern detection based on the combination of at least one, but in many cases at least two, such as at least three, such as all, of the received data streams. The pattern detection may be further based on one, or in some cases at least two or more, events detected for each individual one of the data streams by the event detection function 132. Such detected events taking into consideration by the pattern detection function 134 may be distributed across time with respect to each individual collected stream. The pattern detection function 134 may include an AI component 134*a* for performing the pattern detection.

The central server 130 further includes a production function 135, arranged to produce a shared digital video stream based on the data streams provided from the collecting function 131, and further based on any detected events and/or patterns. The shared video stream at least includes a video stream produced to include one or several of video streams provided by the collecting function 131, raw, reformatted or transformed, and may also include corresponding audio stream data.

The central server 130 further includes a publishing function 136, arranged to publish the produced shared digital video stream, such as via API 137 as described above.

It is noted that FIGS. 1, 2 and 3 illustrate three different examples of how the central server 130 can be used to implement the principles described herein, and in particular to provide a method according to various embodiments, but that other configurations, with or without using one or several video communication services 110, are also possible.

Figure 5:
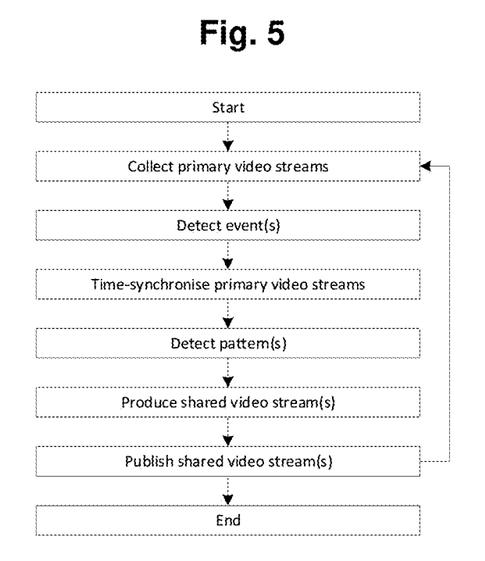
FIG. 5 illustrates a central server for use in a system according to some embodiments.

Hence, FIG. 5 illustrates a method according to some embodiments, for providing the shared digital video stream. FIGS. 6*a*-6*f* illustrates different digital video/audio data stream states resulting from the method steps illustrated in FIG. 5.

In a first step, the method starts.

In a subsequent collecting step, respective primary digital video streams 210, 301 are collected, such as by the collecting function 131, from at least two of the digital video sources 120, 300. Each such primary data stream 210, 301 may include an audio part 214 and/or a video part 215. It is understood that "video", in this context, refers to moving and/or still image contents of such a data stream. Each primary data stream 210, 301 may be encoded according to any video/audio encoding specification (using a respective codec used by the entity providing the primary stream 210, 301 in question), and the encoding formats may be different across different ones of the primary streams 210, 301 concurrently used in one and the same video communication. It is preferred that at least one, such as all, of the primary data streams 210, 301 is provided as a stream of binary data, possibly provided in a per se conventional data container data structure. It is preferred that at least one, such as at least two, or even all of the primary data streams 210, 301 are provided as respective live video recordings.

It is noted that the primary streams 210, 301 may be unsynchronised in terms of time when they are received by the collecting function 131. This may mean that they are associated with different latencies or delays in relation to each other. For instance, in case two primary video streams 210, 301 are live recordings, this may imply that they are associated, when received by the collecting function 131, with different latencies with respect to the time of recording.

It is also noted that the primary streams 210, 301 may themselves be a respective live camera feed from a web camera; a currently shared screen or presentation; a viewed film clip or similar; or any combination of these arranged in various ways in one and the same screen.

Figure 6A:
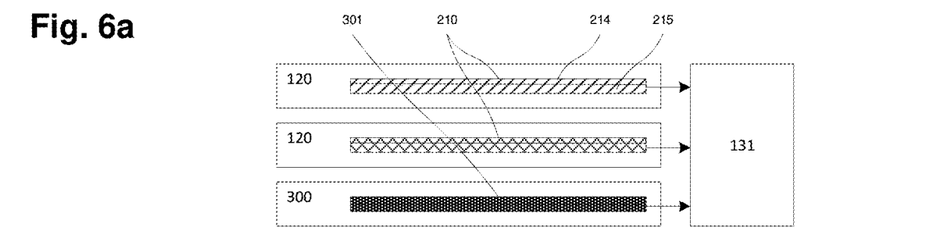
FIGS. 6a-6f illustrate subsequent states in relation to the different method steps in the method illustrated in FIGS. 5.
Figure 6B:
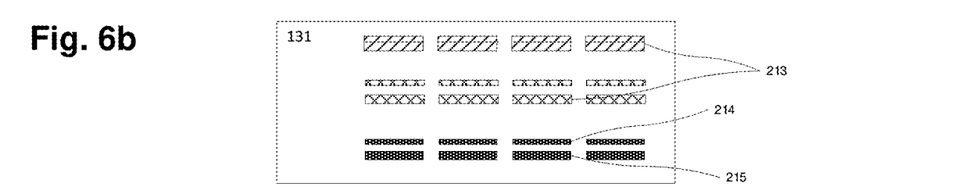

The collecting step is shown in FIGS. 6*a* and 6*b*. In FIG. 6*b*, it is also illustrated how the collecting function 131 can store each primary video stream 210, 301 as bundled audio/video information or as audio stream data separated from associated video stream data. FIG. 6*b* illustrates how the primary video stream 210, 301 data is stored as individual frames 213 or collections/clusters of frames, "frames" here referring to time-limited parts of image data and/or any associated audio data, such as each frame being an individual still image or a consecutive series of images (such as such a series constituting at the most 1 second of moving images) together forming moving-image video content.

Figure 6C:
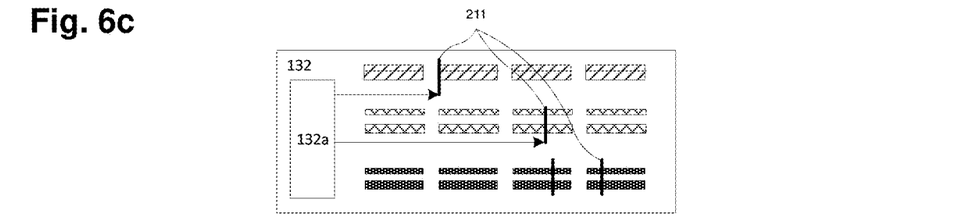

In a subsequent event detection step, performed by the event detection function 132, the primary digital video streams 210, 301 are analysed, such as by the event detection function 132 and in particular the AI component 132*a*, to detect at least one event 211 selected from a first set of events. This is illustrated in FIG. 6*c*.

It is preferred that this event detections step is performed for at least one, such as at least two, such as all, primary video streams 210, 301, and that it is performed individually for each such primary video stream 210, 301. In other words, the event detection step preferably takes place for the individual primary video stream 210, 301 only taking into consideration information contained as a part of that particular primary video stream 210, 301 in question, and particularly without taking into consideration information contained as a part of other primary video streams. Furthermore, the event detection preferably takes place without taking into consideration any common time reference 260 associated with the several primary video streams 210, 301.

On the other hand, the event detection preferably takes into consideration information contained as a part of the individually analysed primary video stream in question across a certain time interval, such as a historic time interval of the primary video stream that is longer than 0 seconds, such as at least 0.1 seconds, such as at least 1 second.

The event detection may take into consideration information contained in audio and/or video data contained as a part of the primary video stream 210, 301.

The first set of events may contain any number of types of events, such as a change of slides in a slide presentation constituting or being a part of the primary video stream 210, 301 in question; a change in connectivity quality of the source 120, 300 providing the primary video stream 210, 301 in question, resulting in an image quality change, a loss of image data or a regain of image data; and a detected movement physical event in the primary video stream 210, 301 in question, such as the movement of a person or object in the video, a change of lighting in the video, a sudden sharp noise in the audio or a change of audio quality. It is realised that this is not intended to be an exhaustive list, but that these examples are provided in order to understand the applicability of the presently described principles.

Figure 6D:
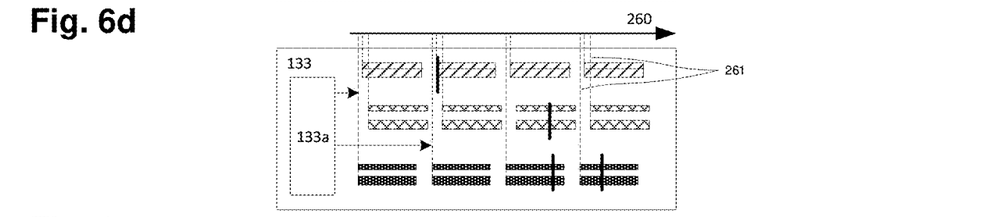

In a subsequent synchronising step, performed by the synchronisation function 133, the primary digital video streams 210 are time-synchronised with respect to a common time reference 260. As illustrated in FIG. 6*d*, this time-synchronisation involves aligning the primary video streams 210, 301 in relation to each other, using the common time reference 260, so that they can be combined to form a time-synchronised context. The common time reference 260 may be a stream of data, a heartbeat signal or other pulsed data, or a time anchor applicable to each of the individual primary video streams 210, 301. What is important is that the common time reference can be applied to each of the individual primary video streams 210, 301 in a way so that the informational contents of the primary video stream 210, 301 in question can be unambiguously related to the common time reference with respect to a common time axis. In other words, the common time reference allows the primary video streams 210, 301 to be aligned, via time shifting, so as to be time-synchronised in the present sense.

Figure 6E:
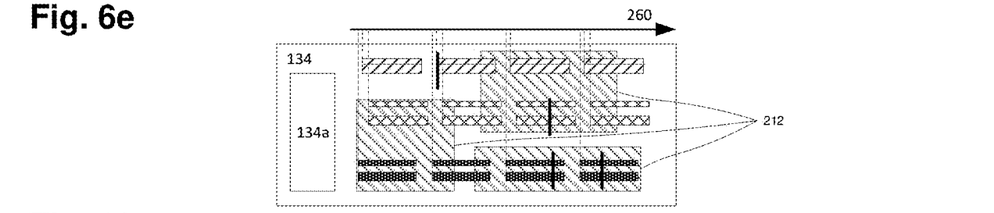

As illustrated in FIG. 6*d*, the time-synchronisation may include determining, for each primary video streams 210, 301, one or several timestamps 261, in relation to the common time reference 260.

in a subsequent pattern detection step, performed by the pattern detection function 134, the hence time-synchronised primary digital video streams 210, 301 are analysed to detect at least one pattern 212 selected from a first set of patterns. This is illustrated in FIG. 6*e*.

In contrast to the event detection step, the pattern detection step may preferably be performed based on video and/or audio information contained as a part of at least two of the time-synchronised primary video streams 210, 301 considered jointly.

The first set of patterns may contain any number of types of patterns, such as several participants talking interchangeably or concurrently; or a presentation slide change occurring concurrently as a different event, such as a different participant talking. This list is not exhaustive, but illustrative.

In alternative embodiments, detected patterns 212 may relate not to information contained in several of the primary video streams 210, 301 but only in one of the primary video streams 210, 301. In such cases, it is preferred that such pattern 212 is detected based on video and/or audio information contained in that single primary video stream 210, 301 spanning across at least two detected events 211, for instance two or more consecutive detected presentation slide changes or connection quality changes. As an example, several consecutive slide changes that follow on each other rapidly over time may be detected as one single slide change pattern, as opposed to one individual slide change pattern for each detected slide change event.

It is realised that the first set of events and the first set of patterns may include events/patterns being of predetermined types, defined using respective sets of parameters and parameter intervals. As will be explained below, the events/patterns in the sets may also, or additionally, be defined and detected using various AI tools.

In a subsequent production step, performed by the production function 135, the shared digital video stream is produced as an output digital video stream 230 based on consecutively considered frames 213 of the time-synchronised primary digital video streams 210, 301 and the detected patterns 212.

As will be explained and detailed in the following, the various embodiments of the present invention allow for the completely automatic production of the output digital video stream 230.

For instance, such production may involve the selection of what video and/or audio information from what primary video stream 210, 301 to use to what extent in the output video stream 230; a video screen layout of the output video stream 230; a switching pattern between different such uses or layouts across time; and so forth.

Figure 6F:
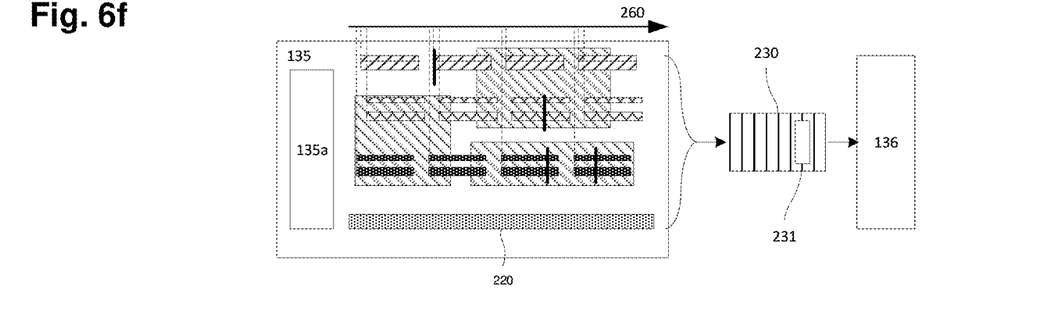

This is illustrated in FIG. 6*f*, that also shows one or several additional pieces of time-related (related to the common time reference 260) digital video information 220, such as an additional digital video information stream, that can be time-synchronised with the common time reference 260 and used in concert with the time-synchronised primary video streams 210, 301 in the production of the output video stream 230. For instance, the additional stream 220 may include information with respect to any video and/or audio special effects to use, such as dynamically based on detected patterns; a planned time schedule for the video communication; and so forth.

In a subsequent publishing step, performed by the publishing function 136, the produced output digital video stream 230 is continuously provided to a consumer 110, 150 of the shared digital video stream as described above.

In a subsequent step, the method ends. However, first the method may iterate any number of times, as illustrated in FIG. 5, to produce the output video stream 230 as a continuously provided stream. Preferably, the output video stream 230 is produced to be consumed in real-time or near real-time (taking into consideration a total latency added by all steps along the way), and continuously (publishing taking place immediately when more information is available, however not counting the below-described deliberately added latency). This way, the output video stream 230 may be consumed in an interactive manner, so that the output video stream 230 may be fed back into the video communication service 110 or into any other context forming a basis for the production of a primary video stream 210 again being fed to the collection function 131 so as to form a closed feedback loop; or so that the output video stream 230 may be consumed into a different (external to system 100 or at least external to the central server 130) context but there forming the basis of a real-time, interactive video communication.

As mentioned above, in some embodiments at least two of the primary digital video streams 210, 301 are provided as a part of a shared digital video communication, such as provided by the video communication service 110, the video communication involving a respective remotely connected participant client 121 providing the primary digital video stream 210 in question. In such cases, the collecting step may include collecting at least one of the primary digital video streams 210 from the shared digital video communication service 110 itself, such as via an automatic participant client 140 in turn being granted access to video and/or audio stream data from within the video communication service 110 in question; and/or via an API 112 of the video communication service 110.

Moreover, in this and in other cases the collecting step may include collecting at least one of the primary digital video streams 210, 301 as a respective external digital video stream 301, collected from an information source 300 being external to the shared digital video communication service 110. It is noted that one or several used such external video sources 300 may also be external to the central server 130.

In some embodiments, the primary video streams 210, 301 are not formatted in the same manner. Such different formatting can be in the form of them being delivered to the collecting function 131 in different types of data containers (such as AVI or MPEG), but in preferred embodiments at least one of the primary video streams 210, 301 is formatted according to a deviating format (as compared to at least one other of the primary video streams 210, 301) in terms of the deviating primary digital video stream 210, 301 having a deviating video encoding; a deviating fixed or variable frame rate; a deviating aspect ratio; a deviating video resolution; and/or a deviating audio sample rate.

It is preferred that the collecting function 131 is preconfigured to read and interpret all encoding formats, container standards, etc. that occur in all collected primary video streams 210, 301. This makes it possible to perform the processing as described herein, not requiring any decoding until relatively late in the process (such as not until after the primary stream in question is put in a respective buffer; not until after the event detection step; or even not until after the event detection step). However, in the rare case in which one or several of the primary video feeds 210, 301 are encoded using a codec that the collecting function 131 cannot interpret without decoding, the collecting function 131 may be arranged to perform a decoding and analysis of such primary video stream 210, 301, followed by a conversion into a format that can be handled by, for instance, the event detection function. It is noted that, even in this case, it is preferred not to perform any reencoding at this stage.

For instance, primary video streams 220 being fetched from multi-party video events, such as one provided by the video communication service 110, typically have requirements on low latency and are therefore typically associated with variable framerate and variable pixel resolution to enable participants 122 to have an effective communication. In other words, overall video and audio quality will be decreased as necessary for the sake of low latency.

External video feeds 301, on the other hand, will typically have a more stable framerate, higher quality but therefore possibly higher latency.

Hence, the video communication service 110 may, at each moment in time, use a different encoding and/or container than the external video source 300. The analysis and video production process described herein therefore needs to combine these streams 210, 301 of different formats into a new one for the combined experience.

As mentioned above, the collecting function 131 may include a set of format-specific collecting functions 131a, each one arranged to process a primary video stream 210, 301 of a particular type of format. For instance, each one of these format-specific collecting functions 131a may be arranged to process primary video streams 210, 301 having been encoded using a different video respective encoding method/codec, such as Windows® Media® or DivX®.

However, in preferred embodiments the collecting step includes converting at least two, such as all, of the primary digital video streams 210, 301 into a common protocol 240.

As used in this context, the term "protocol" refers to an information-structuring standard or data structure specifying how to store information contained in a digital video/audio stream. The common protocol preferably does not, however, specify how to store the digital video and/or audio information as such on a binary level (i.e. the encoded/compressed data instructive of the sounds and images themselves), but instead forms a structure of predetermined format for storing such data. In other words, the common protocol prescribes storing digital video data in raw, binary form without performing any digital video decoding or digital video encoding in connection to such storing, possibly by not at all amending the existing binary form apart from possibly concatenating and/or splitting apart the binary form byte sequence. Instead, the raw (encoded/compressed) binary data contents of the primary video stream 210, 301 in question is kept, while repacking this raw binary data in the data structure defined by the protocol. In some embodiments, the common protocol defines a video file container format.

Figure 7:
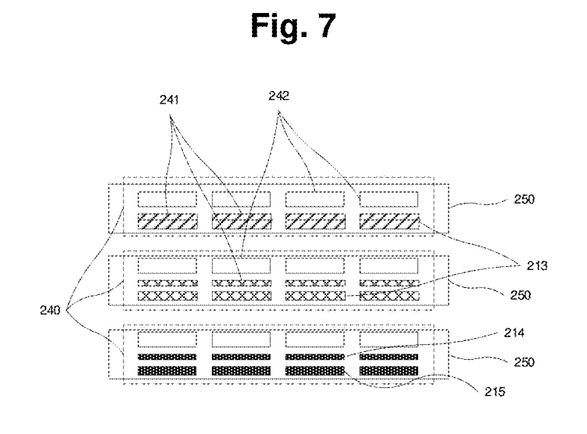
FIG. 7 illustrates, conceptually, a common protocol for used in some embodiments.

FIG. 7 illustrates, as an example, the primary video streams 210, 301 shown in FIG. 6a, restructured by the respective format-specific collecting function 131a and using the common protocol 240.

Hence, the common protocol 240 prescribes storing digital video and/or audio data in data sets 241, preferably divided into discreet, consecutive sets of data along a timeline pertaining to the primary video stream 210, 301 in question. Each such data set may include one or several video frames, and also associated audio data.

The common protocol 240 may also prescribe storing metadata 242 associated with specified time points in relation to the stored digital video and/or audio data sets 241.

The metadata 242 may include information about the raw binary format of the primary digital video stream 210 in question, such as regarding a digital video encoding method or codec used to produce the raw binary data; a resolution of the video data; a video frame rate; a frame rate variability flag; a video resolution; a video aspect ratio; an audio compression algorithm; or an audio sampling rate. The metadata 242 may also include information on a timestamp of the stored data, in relation to a time reference of the primary video stream 210, 301 in question as such.

Using the format-specific collecting functions 131a in combination with the common protocol 240 makes it possible to quickly collect the informational contents of the primary video streams 210, 301 without adding latency by decoding/reencoding the received video/audio data.

Hence, the collecting step may include using different ones of the format-specific collecting functions 131a for collecting primary digital video streams 210, 301 being encoded using different binary video and/or audio encoding formats, in order to parse the primary video stream 210, 301 in question and store the parsed, raw and binary data in a data structure using the common protocol, together with any relevant metadata. Self-evidently, the determination as to what format-specific collecting function 131a to use for what primary video stream 210, 301 may be performed by the collecting function 131 based on predetermined and/or dynamically detected properties of each primary video stream 210, 301 in question.

Each hence collected primary video stream 210, 301 may be stored in its own separate memory buffer, such as a RAM memory buffer, in the central server 130.

The converting of the primary video streams 210, 301 performed by each format-specific collecting function 131a may hence include splitting raw, binary data of each thus converted primary digital video stream 210, 301 into an ordered set of the smaller sets of data 241.

Moreover, the converting may also include associating each (or a subset, such as a regularly distributed subset along a respective timeline of the primary stream 210, 301 in question) of the smaller sets 241 with a respective time of the common time reference 260. This associating may be performed by analysis of the raw binary video and/or audio data in any of the principle ways described below, or in other ways, and may be performed in order to be able to perform the subsequent time-synchronising of the primary video streams 210, 301. Depending on the type of common time reference 260 used, at least part of this association of each of the data sets 241 may also or instead be performed by the synchronisation function 133. In the latter case, the collecting step may instead include associating each, or a subset, of the smaller sets 241 with a respective time of a timeline specific for the primary stream 210, 301 in question.

In some embodiments, the collecting step also includes converting the raw binary video and/or audio data collected from the primary video streams 210, 301 into a uniform quality and/or updating frequency. This may involve downsampling or up-sampling of the raw, binary digital video and/or audio data of the primary digital video streams 210, 301, as necessary, to a common video frame rate; a common video resolution; or a common audio sampling rate. It is noted that such re-sampling can be performed without performing a full decoding/reencoding, or even without performing any decoding at all, since the format-specific collecting function 131a in question can process the raw binary data directly according to the correct binary encoding target format.

Preferably, each of the primary digital video streams 210, 301 is stored in an individual data storage buffer 250, as individual frames 213 or sequences of frames 213 as described above, and also each associated with a corresponding time stamp in turn associated with the common time reference 260.

In a concrete example, provided for illustrative purposes, the video communication service 110 is Microsoft® Teams®, running a video conference involving concurrent participants 122. The automatic participant client 140 is registered as a meeting participant in the Teams® meeting.

Then, the primary video input signals 210 are available to and obtained by the collecting function 130 via the automatic participant client 140. These are raw signals in H264 format and contain timestamp information for every video frame.

The relevant format-specific collecting function 131a picks up the raw data over IP (LAN network in the cloud) on a configurable predefined TCP port. Every Teems® meeting participant, as well as associated audio data, are associated with a separate port. The collecting function 131 then uses the timestamps from the audio signal (which is in 50 Hz) and down-samples the video data to a fixed output signal of 25 Hz before storing the video stream 220 in its respective individual buffer 250.

As mentioned, the common protocol 240 stores the data in raw binary form. It can be designed to be very low-level, and to handle the raw bits and bytes of the video/audio data. In preferred embodiments, the data is stored in the common protocol 240 as a simple byte array or corresponding data structure (such as a slice). This means that the data does not need to be put in a conventional video container at all (the common protocol 240 not constituting such conventional container in this context). Also, encoding and decoding video is computationally heavy, which means it causes delays and requires expensive hardware. Moreover, this problem scales with the number of participants.

Using the common protocol 240, it becomes possible to reserve memory in the collecting function 131 for the primary video stream 210 associated with each Teams® meeting participant 122, and also for any external video sources 300, and then to change the amount of memory allocated on the fly during the process. This way, it becomes possible to change the number of input streams and as a result keep each buffer effective. For instance, since information like resolution, framerate and so forth may be variable but stored as metadata in the common protocol 240, this information can be used to quickly resize each buffer as need may be.

The following is an example of a specification of a common protocol 240 of the present type:

| Bytes | Example | Description |
|---|---|---|
| 1 byte | 1 | 0 = video; 1 = audio |
| 4 bytes | 1234567 | Buffer Length (int) |
| 8 bytes | 424234234 | Timestamp from the incoming audio/video buffer |
| | | Measured in ticks, 1tick = 100 ns. (long int) |
| 1 byte | 0 | VideoColorFormat |
| | | { |
| | | NV12 = 0, |
| | | Rgb24 = 1, |
| | | Yuy2 = 2, |
| | | H264 = 3 |
| | | } |
| 4 bytes | 720 | Video frame pixel height (int) |
| 4 bytes | 640 | Video frame pixel width (int) |
| 4 bytes | 25.0 | Video frame rate |
| | | Number of frames per second (float) |
| 1 byte | 0 | Is audio silence? 1 = true; 0 = false |
| 1 byte | 0 | AudioFormat |
| | | { |
| | | 0 = Pcm16K |
| | | 1 = Pcm44KStereo |
| | | } |

-continued

The following is an example of a specification
of a common protocol 240 of the present type:

| Bytes | Example | Description |
|---|---|---|
| 1 byte | 0 | Detected event in, if any<br>0 = no event<br>1, 2, 3, etc. = event of specified type detected |
| 30 bytes | | Reserved for future use |
| 8 bytes | 1000000 | Length of binary data in bytes (long int) |
| Variable | 0x87A879 . . . | Raw binary video/audio data of this frame(s) |
| 4 bytes | 1234567 | Dominant speaker Port |
| 4 bytes | 1234567 | Active speaker |

Above, the "Detected event in, if any" data is included as a part of the common protocol 260 specification. However, in some embodiments, this information (regarding detected events) may instead be put in a separate memory buffer.

In some embodiments, the at least one additional piece of digital video information 220, that may be an overlay or an effect, is also stored in a respective individual buffer 250, as individual frames or sequences of frames each associated with a corresponding time stamp in turn associated with the common time reference 260.

As exemplified above, the event detection step may include storing, using the common protocol 240, metadata 242 descriptive of a detected event 211, associated with the primary digital video stream 210, 301 in which the event 211 in question was detected.

The event detection can be performed in different ways. In some embodiments, performed by the AI component 132a, the event detection step includes a first trained neural network or other machine learning component analysing at least one, such as several or even all, of the primary digital video streams 210, 301 individually in order to automatically detect any of the events 211. This may involve the AI component 132a classifying, in a managed classification, the primary video stream 210, 301 data into a set of predefined events and/or, in an unmanaged classification, into a dynamically determined set of events.

In some embodiments, the detected event 211 is a change of presentation slides in a presentation being or being included in the primary video stream 210, 301 in question.

For instance, if the presenter of the presentation decides to change the slide in the presentation he/she is giving at that time to an audience, this means that what is interesting for a given viewer can change. It may be that the newly shown slide is only a high-level picture that can best be seen briefly in a so-called "butterfly" mode (for instance, displaying in the output video stream 230 the slide side-by-side with a video of the presenter). Alternatively, the slide may contain much detail, text with small font sizes, and so forth. In this latter case, the slide should instead be presented in full-screen and perhaps during a somewhat longer time period than what is usually the case. A butterfly mode may not be as appropriate, since the slide in this case may be more interesting to a viewer of the presentation than the face of the presenter.

In practice, the event detection step may include at least one of the following:

Firstly, the event 211 can be detected based on an image analysis of a difference between a first image of a detected slide and a subsequent second image of a detected slide. The nature of the primary video stream 220, 301 being that of showing a slide can be automatically determined using per se conventional digital image processing, such as using motion detection in combination with OCR (Optical Character Recognition).

This may involve checking, using automatic computer image processing techniques, whether the detected slide has changed significantly enough to actually categorise it as a slide change. This may be done by checking the delta between current slide and previous slide with respect to RGB colour values. For instance, one may assess how much the RGB values have changed globally in the screen area covered by the slide in question, and whether it is possible to find groups of pixels that belong together and that change in concert. This way, relevant slide changes can be detected while, for instance, filtering out irrelevant changes such as shown computer mouse movements across the screen. This approach also allows full configurability—for instance, sometimes it is desired to be able to capture computer mouse movement, for instance when the presenter wishes to present something in detail using the computer mouse to point to different things.

Secondly, the event 211 may be detected based on an image analysis of an informational complexity of the second image itself, to determine the type of event with greater specificity.

This may, for instance, involve assessing a total amount of textual information on the slide in question, as well as associated font sizes. This may be done by using conventional OCR methods, such as deep learning-based character recognition techniques.

It is noted that, since the raw binary format of the assessed video stream 210, 301 is known, this may be performed directly in the binary domain, without first decoding or reencoding the video data. For instance, the event detection function 132 may call the relevant format-specific collecting function for image interpreting services, or the event detection function 132 may itself include functionality for assessing image information, such as on individual pixel level, for a number of different supported raw binary video data formats.

In another example, the detected event 211 is a loss of communication connection of a participant client 121 to a digital video communication service 110. Then, the detection step may include detecting that the participant client 121 has lost communication connection based on an image analysis of a series of subsequent video frames 213 of a primary digital video stream 210 corresponding to the participant client 121 in question.

Because participant clients 121 are associated with different physical locations and different internet connections, it can happen that someone will lose connection to the video communication service 110 or the central server 130. In that situation, it is desirable to avoid showing a black or empty screen in the produced output video stream 230.

Instead, such connection loss can be detected as an event by the event detection function 132, such as by applying a 2-class classification algorithm where the 2 classes used are connected/not connected (no data). In this case, it is understood that "no data" differs from the presenter sending out a black screen intentionally. Because a brief black screen, such as of only 1 or 2 frames, may not be noticeable in the end production stream 230, one may apply the 2-class classification algorithm over time to create a time series. Then, a threshold value, specifying a minimum length for a connection interruption, can be used to decide whether there is a lost connection or not.

As will be explained in the following, detected events of these exemplified types may be used by the pattern detection function 134 to take various actions, as suitable and desired.

As mentioned, the individual primary video streams 210, 301 are each related to the common time reference 260, making it possible for the synchronisation function 133 to time-synchronise them in relation to each other.

In some embodiments, the common time reference 260 is based on or includes a common audio signal 111 (see FIGS. 1-3), the common audio signal 111 being common for the shared digital video communication service 110 involving at least two remotely connected participant clients 121 as described above, each providing a respective one of the primary digital video streams 210.

In the example of Microsoft® Teams® discussed above, a common audio signal is produced and can be captured by the central server 130 via the automatic participant client 140 and/or via the API 112. In this and in other examples, such a common audio signal may be used as a heartbeat signal to time-synchronise the individual primary video streams 220 by binding each of these to specific time points based on this heartbeat signal. Such a common audio signal may be provided as a separate (in relation to each of the other primary video streams 210) signal, whereby the other primary video streams 210 may each be individually time-correlated to the common audio signal, based on audio contained in the other primary video stream 210 in question or even based on image information contained therein (such as using automatic image processing-based lip syncing techniques).

In other words, to handle any variable and/or differing latency associated with individual primary video streams 210, and to achieve time-synchronisation for the combined video output stream 230, such a common audio signal is used as a heartbeat for all primary video streams 210 in the central server 130 (but perhaps not external primary video streams 301). In other words, all other signals are mapped to this common audio time heartbeat to make sure that everything is in time sync.

In a different example, the time-synchronisation is achieved using a time synchronisation element 231 introduced into the output digital video stream 230 and detected by a respective local time-synchronising software function 125 provided as a part of one or several individual ones of the participant clients 121, the local software function 125 being arranged to detect a time of arrival of the time synchronisation element 231 in the output video stream 230. As is understood, in such embodiments the output video stream 230 is fed back into the video communication service 110 or otherwise made available to each participant client 121 and the local software function 125 in question.

For instance, the time synchronisation element 231 may be a visual marker, such as a pixel changing colours in a predetermined sequence or manner, placed or updated in the output video 230 at regular time intervals; a visual clock updated and displayed in the output video 230; a sound signal (that may be designed to be non-audible to participants 122 by, for instance, having low enough amplitude and/or high enough frequency) and added to an audio forming part of the output video stream 230. The local software function 125 is arranged to, using suitable image and/or audio processing, automatically detect respective times of arrival of each of the (or each of the) time synchronisation element(s) 231.

Then, the common time reference 260 may be determined at least partly based on the detected times of arrival. For instance, each of the local software functions 125 may communicate to the central server 130 respective information signifying the detected time of arrival.

Such communication may take place via a direct communication link between the participant client 121 in question and the central server 130. However, the communication may also take place via the primary video stream 210 associated with the participant client 121 in question. For instance, the participating client 121 may introduce a visual or audible code, such as of the above discussed type, in the primary video stream 210 produced by that participant client 121 in question, for automatic detection by the central server 130 and used to determine the common time reference 260.

In yet additional examples, each participant client 121 may perform an image detection in a common video stream available for viewing by all participant clients 121 to the video communication service 110 and relay the results of such image detection to the central server 130, in a way corresponding to the ones discussed above, to there be used to over time determine respective offsets of each participant client 121 in relation to each other.

This way, the common time reference 260 may be determined as a set of individual relative offsets. For instance, a selected reference pixel of a commonly available video stream may be monitored by several, or all, participating clients 121, such as by the local software function 125, and a current colour of that pixel may be communicated to the central server 130. The central server 130 may calculate a respective time series based on consecutively received such colour values from each of a number of (or all) the participant clients 121 and perform a cross-correlation resulting in an estimated set of relative time offsets across the different participant clients 121.

In practice, the output video stream 230 fed into the video communication service 110 may be included as a part of a shared screen every participant client of the video communication in question and may therefore be used to assess such time offset associated with the participant clients 121. In particular, the output video stream 230 fed to the video communication service 110 may be available again to the central server via the automatic participant client 140 and/or the API 112.

In some embodiments, the common time reference 260 may be determined at least partly based on a detected discrepancy between an audio part 214 of a first one of the primary digital video streams 210, 301 and an image part 215 of the first primary digital video streams 210, 301. Such discrepancy may, for instance, be based on a digital lip sync video image analysis of a talking participant 122 viewed in the first primary digital video stream 210, 301 in question. Such lip sync analysis is conventional as such and may for instance use a trained neural network. The analysis may be performed by the synchronisation function 133 for each primary video stream 210, 301 in relation to available common audio information, and relative offsets across the individual primary video streams 210, 301 may be determined based on this information.

In some embodiments, the synchronisation step includes deliberately introducing a latency of at the most 30 seconds, such as at the most 5 seconds, such as at the most 1 seconds, such as at the most 0.5 seconds, but longer than 0 s, so that the output digital video stream 230 is provided at least with the latency. At any rate, the deliberately introduced latency is at least several video frames, such as at least three, or even at least five or even 10, video frames, such as this number of frames (or individual images) stored after any resampling in the collecting step. As used herein, the term "deliberately" means that the latency is introduced irrespective of any need for introducing such a latency based on synchronisation issues or similar. In other words, the deliberately introduced latency is introduced in addition to any latency introduced as a part of the synchronisation of the primary video streams 210, 301 in order to time-synchronise them one in relation to the other. The deliberately introduced latency may be predetermined, fixed or variable in relation to the common time reference 260. The latency time may be measured in relation to a least latent one of the primary video streams 210, 301, so that more latent ones of these streams 210, 301 as a result of the time-synchronisation are associated with a relatively smaller deliberately added latency.

In some embodiments, a relatively small latency is introduced, such as of 0.5 seconds or less. This latency will barely be noticeable by participants to a video communication service 110 using the output video stream 230. In other embodiments, such as when the output video stream 230 will not be used in an interactive context but is instead published in a one-way communication to an external consumer 150, a larger latency may be introduced.

This deliberately introduced latency achieves sufficient time for the synchronisation function 133 to map the collected individual primary stream 210, 301 video frames onto the correct common time reference 260 timestamp 261. It also allows sufficient time to perform the event detection described above, in order to detect lost primary stream 210, 301 signals, slide changes, resolution changes, and so forth. Furthermore, deliberately introducing the latency allows for an improved pattern detection function 134, as will be described in the following.

It is realized that the introduction of the latency involves buffering 250 each of the collected and time-synchronised primary video streams 210, 301 before publishing the output video stream 230 using the buffered frames 213 in question. In other words, video and/or audio data of at least one, several or even all of the primary video streams 210, 301 will be present in the central server 130 in a buffered manner, much like a cache but not (like a conventional cache buffer) used with the intention of being able to handle varying bandwidth situations but for the above reasons, and in particular to be used by the pattern detection function 134.

Hence, in some embodiments the pattern detection step includes taking into consideration certain information of at least one, such as several or even all, of the primary digital video streams 210, 301, the certain information being present in a later frame 213 than a frame of a time-synchronised primary digital video stream 210 yet to be used in the production of the output digital video stream 230. Hence, a newly added frame 213 will exist in the buffer 250 in question during a particular latency time before forming part of (or basis for) the output video stream 230. During this time period, the information in the frame 213 in question will constitute information in the "future" in relation to a currently used frame to produce a current frame of the output video stream 230. Once the output video stream 230 timeline reaches the frame in question 213, it will be used for the production of the corresponding frame of the output video stream 230 and may thereafter be discarded.

In other words, the pattern detection function 134 has at its disposal a set of video/audio frames 213 that have still not been used to produce the output video stream 230 and uses this data to detect the patterns.

The pattern detection can be performed in different ways. In some embodiments, performed by the AI component 134a, the pattern detection step includes a second trained neural network or other machine learning component analysing at least two, such as at least three or even all, of the primary digital video streams 120, 301 in concert to automatically detect the pattern 212.

In some embodiments, the detected pattern 212 includes a speaking pattern involving at least two different speaking participants 122, each associated with a respective participant client 121, to the shared video communication service 110, each of the speaking participants 122 being viewed visually in a respective one of the primary digital video streams 210, 301.

The production step preferably includes determining, keeping track of, and updating a current production state of the output video stream 230. For instance, such a state can dictate what, if any, participants 122 are visible in the output video stream 230, and where on the screen; if any external video stream 300 is visible in the output video stream 230, and where on the screen; if any slides or shared screens are shown in full-screen mode or in combination with any live video streams; and so on. Hence, the production function 135 can be viewed as a state machine with respect to the produced output video stream 230.

To generate the output video stream 230 as a combined video experience to be viewed by, for instance, an end consumer 150, it is advantageous for the central server 130 to be able to understand what happens on a deeper level than merely detecting individual events associated with individual primary video streams 210, 301.

In a first example, a presenting participant client 121 is changing a currently viewed slide. This slide change is detected by the event detection function 132 as described above, and metadata 242 is added to the frame in question indicative of a slide change having happened. This happens a number of times, since the presenting participating client 121 turns out to skip a number of slides forward in rapid succession, resulting in a series of "slide change" events detected by the even detection function 132 and stored with corresponding metadata 242 in the individual buffer 250 for the primary video stream 210 in question. In practice, each such rapidly forward skipped slide may be visible for only a fraction of a second.

The pattern detection function 134, looking at the information in the buffer 250 in question, spanning across several of these detected slide changes, will detect a pattern corresponding to one single slide change (that is, to the last slide in the forward-skipping, the slide remining visible once the rapid skipping is finished), rather than a number or rapidly performed slide changes. In other words, the pattern detection function 134 will note that there are, for instance, ten slide changes in a very short period of time, why they will be handled as a detected pattern signifying one single slide change. As a result, the production function 135, having access to the patterns detected by the pattern detection function 134, may choose to show the final slide in full-screen mode in the output video stream 230 for a couple of seconds, since it determines this slide to be potentially important in the state machine. It may also choose not to show the intermediately viewed slides at all in the output stream 230.

The detection of the pattern with several rapidly changing slides may be detected by a simple rule-based algorithm but may alternatively be detected using a trained neural network designed and trained to detect such patterns in moving images by classification.

In a different example, that may for instance be useful in case the video communication is a talk show, panel debate or similar, it may be desirable to quickly switch visual attention between, one the one hand, a current speaker, while, on the other hand, still giving the consumer 150 a relevant viewing experience by producing and publishing a calm and smooth output video stream 230. In this case, the event detection function 132 can continuously analyse each primary video stream 210, 301 to at all times determine whether or not a person being viewed in that particular primary video stream 210, 301 is currently speaking or not. This may, for instance, be performed as described above, using per se conventional image processing tools. Then, the pattern detection function 134 may be operable to detect particular overall patterns, involving several of the primary video streams 210, 301, the patterns being useful for producing a smooth output video stream 230. For instance, the pattern detection function 134 may detect a pattern of very frequent switches between a current speaker and/or patterns involving several concurrent speakers.

Then, the production function 135 can take such detected patterns into consideration when taking automated decisions in relation to the production state, for instance by not automatically switching visual focus to a speaker who only speaks for half a second before again going silent, or to switch to a state where several speakers are displayed side by side during a certain time period when both are speaking interchangeably or concurrently. This state decision process may in itself be performed using time series pattern recognition techniques, or using a trained neural network, but can also be based at least partly on a predetermined set of rules.

In some embodiments, there may be multiple patterns detected in parallel and forming input to the production function 135 state machine. Such multiple patterns may be used by different AI components, computer vision detecting algorithms, and so forth, by the production function 135. As an example, permanent slide changes can be detected while concurrently detecting unstable connections of some participant clients 121, while other patterns detect a current main speaking participant 122. Using all such available pattern data, a classifier neural network can be trained, and/or a set of rules can be developed, for analysis of a time series of such pattern data. Such a classification may be at least partly, such as completely, supervised to result in determined desired state changes to be used in the production. For instance, different such predetermined classifiers can be produced, specifically arranged to automatically produce the output video stream 230 according to various and different production styles and desires. Training may be based on known production state change sequences as desired outputs and known pattern time series data as training data. In some embodiments, a Bayesian model can be used to produce such classifiers. In a concrete example, information can be a priori gleaned from an experienced producer, providing input such as "in a talk show I never switch from speaker A to Speaker B directly but always first show an overview before I focus on the other speaker, unless that the other speaker is very dominant and speaking loud." This production logic then be represented as a Bayesian model on the general form "if X is true | given the fact that Y is true | perform Z". The actual detection (of whether someone is speaking loudly, etc.) could be performed using a classifier or threshold-based rules.

With large data sets (of pattern time series data), one can use deep learning methods to develop correct and appealing production formats for use in automated productions of video streams.

In summary, using a combination of the event detection based on individual primary video streams 210, 301; the deliberately introduced latency; the pattern detection based on several time-synchronised primary video streams 210, 301 and the detected events; and the production process based on the detected patterns, makes it possible to achieve automated production of the output digital video stream 230 according to a wide possible selection of tastes and styles. This result is valid across a wide range of possible neural network and/or rule-based analysis techniques used by the event detection function 132, pattern detection function 134 and production function 135.

As exemplified above, the production step may include producing the output digital video stream 230 based on a set of predetermined and/or dynamically variable parameters regarding visibility of individual ones of the primary digital video streams 210, 301 in the output digital video stream 230; visual and/or audial video content arrangement; used visual or audio effects; and/or modes of output of the output digital video stream 230. Such parameters may be automatically determined by the production function 135 state machine and/or be set by an operator controlling the production (making it semi-automatic) and/or be predetermined based on certain a priori configuration desires (such as a shortest time between output video stream 230 layout changes or state changes of the above-exemplified types).

In practical examples, the state machine may support a set of predetermined standard layouts that may be applied to the output video stream 230, such as a full-screen presenter view (showing a current speaking participant 122 in full-screen); a slide view (showing a currently shared presentation slide in full-screen); "butterfly view", showing both a currently speaking participant 122 together with a currently shared presentation slide, in a side-by-side view; a multi-speaker view, showing all or a selected subset of participants 122 side-by-side or in a matrix layout; and so forth. Various available production formats can be defined by a set of state machine state changing rules (as exemplified above) together with an available set of states (such as the set of standard layouts). For instance, one such production format may be "panel discussion", another "presentation", and so forth. By selecting a particular production format via a GUI or other interface to the central server 130, an operator of the system 100 may quickly select one of a set of predefined such production formats, and then allow the central server 130 to, completely automatically, produce the output video stream 230 according to the production format in question, based on available information as described above.

Furthermore, during the production a respective in-memory buffer is created and maintained, as described above, for each meeting participant client 121 or external video source 300. These buffers can easily be removed, added, and changed on the fly. The central server 130 can then be arranged to receive information, during the production of the output video stream 230, regarding added/dropped-off participant clients 121 and participants 122 scheduled for delivering speeches; planned or unexpected pauses/resumes of presentations; desired changes to the currently used production format, and so forth. Such information may, for instance, be fed to the central server 130 via an operator GUI or interface, as described above.

As exemplified above, in some embodiments at least one of the primary digital video streams 210, 301 is provided to the digital video communication service 110, and the publishing step may then include providing the output digital video stream 230 to that same communication service 110. For instance, the output video stream 230 may be provided to a participant client 121 of the video communication service 110, or be provided, via API 112 as an external video stream to the video communication service 110. This way, the output video stream 230 may be made available to several or all of the participants to the video communication event currently being achieved by the video communication service 110.

As also discussed above, in addition or alternatively the output video stream 230 may be provided to one or several external consumers 150.

In general, the production step may be performed by the central server 130, providing the output digital video stream 230 to one or several concurrent consumers as a live video stream via the API 137.

Other embodiments of the present invention relate to a computer software function for providing a shared digital video stream according to what has been described above. Such a computer software function is then arranged to, when executing, perform the above-described collecting, event detection, synchronising, pattern detection, production, and publishing steps. The computer software function is arranged to execute on physical or virtual hardware of the central server 130, as described above.

Other embodiments of the present invention relate to the system 100 as such, being a system for providing a shared digital video stream, and in turn including the central server 130. The central server 103, in turn, is arranged to perform the collecting, event detection, synchronising, pattern detection, production, and publishing steps. For instance, these steps are performed by the central server 130 executing the computer software function to perform the steps as described above.

Above, preferred embodiments have been described. However, it is apparent to the skilled person that many modifications can be made to the disclosed embodiments without departing from the basic idea of the invention.

For instance, many additional functions can be provided as a part of the system 100 described herein, and that are not described herein. In general, the presently described solutions provide a framework on top of which detailed functionality and features can be built, to cater for a wide variety of different concrete application wherein streams of video data is used for communication.

One example is a demonstration situation, wherein primary video streams include a view of the presenter, a shared digital slide-based presentation, and a live video of a product being demonstrated.

Another example is a teaching situation, wherein primary video streams include a view of a teacher, a live video of a physical entity being the topic of the teaching, and respective live video of several students that may pose questions and engage in dialogue with the teacher.

In either of these two examples, a video communication service (that may be or may not be part of the system) may provide one or several of the primary video streams, and/or several of the primary video streams may be provided as external video sources of the types discussed herein.

In general, all which has been the in relation to the present method is applicable to the present system and computer software product, and vice versa as applicable.

Hence, the invention is not limited to the described embodiments, but can be varied within the scope of the enclosed claims.

The invention claimed is:

1. A method for providing a shared digital video stream, comprising:
    in a collecting step, collecting from at least two digital video sources respective primary digital video streams;
    in a synchronizing step, time synchronizing the primary digital video streams with respect to a common time reference;
    in a pattern detection step, analyzing the time synchronized primary digital video streams to detect at least one pattern selected from a first set of patterns;
    in a production step, producing the shared digital video stream as an output digital video stream based on consecutively considered frames of the time synchronized primary digital video streams and the detected patterns, and producing the output digital video stream based on a set of predetermined and/or dynamically variable parameters regarding visibility of individual ones of the primary digital video streams in the output digital video stream, including one or more of; visual and/or audial video content arrangement, used visual or audio effects, and modes of output of the output digital video stream; and
    in a publishing step, continuously providing the output digital video stream to a consumer of the shared digital video stream,
    wherein the synchronization step comprises deliberately introducing a latency so that the output digital video stream is provided at least with the latency, and wherein:
        the pattern detection step comprises taking into consideration information of the primary digital video streams, the information being present in a later frame than a frame of a time synchronized primary digital video stream yet to be used in the production of the output digital video stream.

2. The method of claim 1, wherein:
    at least two of the primary digital video streams are provided as a part of a shared digital video communication service involving a respective remotely connected participant client providing the primary digital video stream in question.

3. The method of claim 2, wherein:
    the collecting step comprises collecting at least one of the primary digital video streams from the shared digital video communication service.

4. The method of claim 2, wherein:
    the collecting step comprises collecting at least one of the primary digital video streams as an external digital video stream collected from an information source being external to the shared digital video communication service.

5. The method of claim 1, wherein:
    the collecting step comprises converting at least two of the primary digital video streams into a common protocol, the common protocol prescribing storing digital video data in raw, binary form without performing any digital video decoding or digital video encoding, the common protocol also prescribing storing metadata associated with specified time points in relation to the stored digital video data.

6. The method of claim 1, further comprising:
    in an event detection step, analyzing the primary digital video streams individually to detect at least one event selected from a first set of events.

7. The method of claim 6, wherein:
    the event detection step comprises storing, using the common protocol, metadata descriptive of the detected event, associated with the primary digital video stream in which the event in question was detected.

8. The method of claim 6, wherein:
    the event detection step comprises a first trained neural network or other machine learning component analyzing each of the primary digital video streams in order to automatically detect the event.

9. The method of claim 6, wherein:
the event is a change of presentation slides, and wherein:
the event detection step comprises at least one of:
firstly, detecting the event based on an image analysis of a difference between a first image of a slide and a subsequent second image of a slide; and
secondly, detecting the event based on an image analysis of an informational complexity of the second image.

10. The method of claim 6, wherein:
the event is a loss of communication connection of a participant client to a digital video communication service, and wherein:
the detection step comprises detecting that the participant client has lost communication connection based on an image analysis of a series of subsequent frames of a primary digital video stream corresponding to the participant client in question.

11. The method of claim 1, wherein:
the common time reference comprises a common audio signal, the common audio signal being common for a shared digital video communication service involving at least two remotely connected participant clients each providing a respective one of the primary digital video streams.

12. The method of claim 1, wherein:
at least two of the primary digital video streams are provided by respective participant clients to a shared digital video communication service, each such participant client having a respective local synchronization software arranged to detect a time of arrival of a time synchronization element provided as a part of the output digital video stream provided to the participant client in question, and wherein:
the common time reference is determined at least partly based on the detected times of arrival.

13. The method of claim 1, wherein:
the common time reference is determined at least partly based on a detected discrepancy between an audio part of a first one of the primary digital video streams and an image part of the first primary digital video streams, the discrepancy being based on a digital lip sync video analysis of a talking participant viewed in the first primary digital video stream.

14. The method of claim 1, wherein:
the latency is at the most 30 seconds.

15. The method of claim 1, wherein:
the pattern detection step comprises a second trained neural network or other machine learning component analyzing the primary digital video streams in concert to automatically detect the pattern.

16. The method of claim 1, wherein:
the detected pattern comprises a speaking pattern involving at least two different speaking participants, each associated with a respective participant client, to a shared video communication service, each of the speaking participants being viewed in a respective one of the primary digital video streams.

17. The method of claim 1, wherein:
at least one of the primary digital video streams is provided to a digital video communication service, and
the publishing step comprises providing the output digital video stream to the communication service or to an external consumer.

18. A computer program product for providing a shared digital video stream, the computer program product comprising a non-transitory computer readable storage medium containing instructions that, when executed by one or more processors, cause the one or more processors to perform:
a collecting step, wherein respective primary digital video streams are collected from at least two digital video sources;
a synchronizing step, wherein the primary digital video streams are time-synchronized with respect to a common time reference;
a pattern detection step, wherein the time-synchronized primary digital video streams are analyzed to detect at least one pattern selected from a first set of patterns;
a production step, wherein the shared digital video stream is produced as an output digital video stream based on consecutively considered frames of the time-synchronized primary digital video streams and the detected patterns, and wherein the output digital video stream is produced based on a set of predetermined and/or dynamically variable parameters regarding visibility of individual ones of the primary digital video streams in the output digital video stream, including one or more of; visual and/or audial video content arrangement, used visual or audio effects, and modes of output of the output digital video stream; and
a publishing step, wherein the output digital video stream is continuously provided to a consumer of the shared digital video stream,
wherein the synchronization step comprises deliberately introducing a latency so that the output digital video stream is provided at least with the latency, and wherein:
the pattern detection step comprises taking into consideration information of the primary digital video streams, the information being present in a later frame than a frame of a time-synchronized primary digital video stream yet to be used in the production of the output digital video stream.

19. A system for providing a shared digital video stream, the system comprising a central server in turn comprising:
a collecting function, arranged to collect from at least two digital video sources respective primary digital video streams;
a synchronizing function, arranged to time-synchronize the primary digital video streams with respect to a common time reference;
a pattern detection function, arranged to analyze the time-synchronized primary digital video streams to detect at least one pattern selected from a first set of patterns;
a production function, arranged to produce the shared digital video stream as an output digital video stream based on consecutively considered frames of the time-synchronized primary digital video streams and the detected patterns, and arranged to produce the output digital video stream based on a set of predetermined and/or dynamically variable parameters regarding visibility of individual ones of the primary digital video streams in the output digital video stream, including one or more of; visual and/or audial video content arrangement, used visual or audio effects, and modes of output of the output digital video stream; and
a publishing function, arranged to continuously provide the output digital video stream to a consumer of the shared digital video stream,
wherein the synchronization function is arranged to deliberately introduce a latency so that the output digital video stream is provided at least with the latency, and wherein:

the pattern detection function is arranged to take into consideration information of the primary digital video streams, the information being present in a later frame than a frame of a time-synchronized primary digital video stream yet to be used in the production of the output digital video stream.

* * * * *